July 12, 1966 P. E. DRAPKIN 3,260,968
VARIABLE DELAY NETWORK UTILIZING VOLTAGE-VARIABLE CAPACITORS
Filed May 14, 1962
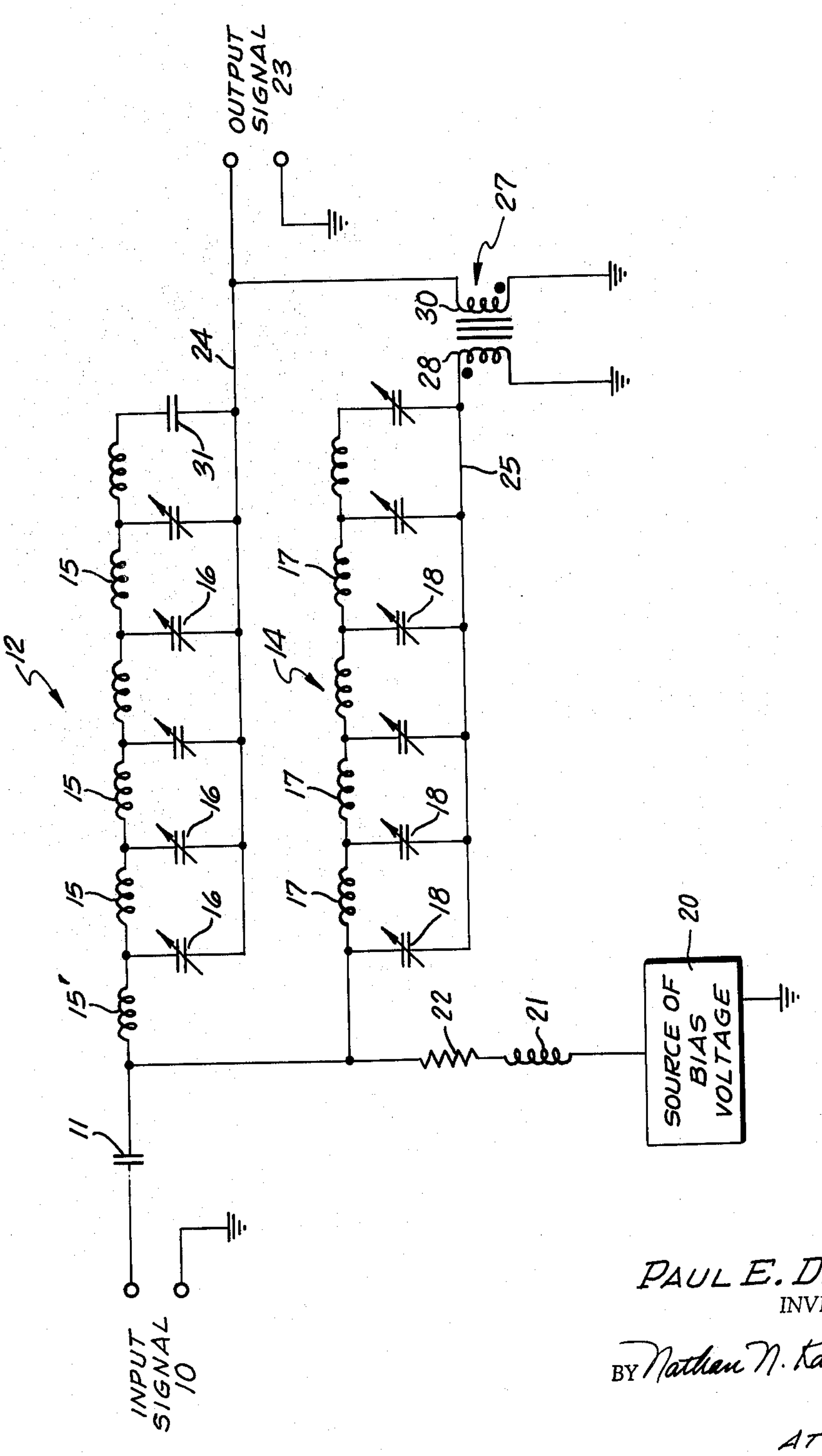
PAUL E. DRAPKIN
INVENTOR.
BY Nathan N. Kallman
ATTORNEY United States Patent Office 3,260,968

Patented July 12, 1966

3,260,968
VARIABLE DELAY NETWORK UTILIZING VOLTAGE-VARIABLE CAPACITORS

Paul E. Drapkin, San Francisco, Calif., assignor to Ampex Corporation, Redwood City, Calif., a corporation of California Filed May 14, 1962, Ser. No. 194,325
5 Claims. (Cl. 333—29)

This invention relates generally to signal transmission networks and particularly relates to a network of the transmission-line type for electronically controlling the delay of a signal.

Time delay networks are well-known in the electronics art and are used frequently in signal transmission systems for delaying an input signal for a predetermined time period. Such time delay networks may consist of a transmission line or of a network with lumped impedances such as a ladder or pi network. However, prior art delay networks have the drawback that they afford only a fixed time delay or a mechanically variable delay. In modern systems, however, a delay device is often required which has a time delay that can be adjusted or even varied at a rapid rate. Furthermore, it is also desirable to provide a time delay network for delaying a signal having a wide frequency band by a fixed or a variable time period. Electrical networks by their very nature do not usually transmit signals over a wide frequency band. Furthermore, the time delay or phase shift of the transmitted signal is generally a function of the frequency of the signal so that the delayed signal may suffer phase distortions after being delayed.

It is, accordingly, an object of the present invention to provide a novel time delay network having a time delay that can be rapidly varied.

Another object of the present invention is to provide an improved ladder network for variably delaying signals having a wide frequency band.

A further object of the present invention is to provide an electrical network, resembling an artificial transmission line, which permits signals having a wide frequency band to be delayed by variable periods of time under the control of electrical signals alone without causing different phase shifts of signal portions having different frequency bands with respect to each other.

Still a further object of the present invention is to provide a variable delay network that uses little power in varying time delay in accordance with an electrical signal, which has a small insertion loss, is small in size and requires few components.

In accordance with the present invention there is provided a variable delay network for variably delaying a signal having a wide frequency band. The network comprises a first and a second network section connected in parallel between the input and output terminals. Each of the network sections is a pi or ladder network and includes inductors and capacitors, the capacitors being of the voltage variable type that are usually referred to as varicaps. A variable bias voltage source is connected to both network sections for applying a variable bias voltage to the varicaps to vary the capacitance thereof. Thus, the time constants of the elements are changed and the delay presented by the network to the signal is varied.

Preferably the two network sections are arranged respectively as a low-pass filter and its dual filter. The input signal that is applied to the two parallel connected sections is processed as two signal portions that are about 180° out of phase relative to each other, so that ripple components are effectively eliminated thereby providing a flat response. Therefore, the output ends of the two network sections are preferably provided with an output transformer for reversing the phase of one of the delayed input signal portions such that the portions may be added in phase to provide a combined output signal.

These and other objects of the present invention will become more apparent as the description proceeds, taken in connection with the accompanying drawing, in which the single figure is a circuit diagram of a variable delay network in accordance with the present invention.

In the drawing, there is illustrated a delay network in accordance with the invention that affords a variable time delay. The input signal to be delayed is impressed on the input terminals 10 and through a coupling capacitor 11 on two network sections 12 and 14 connected in parallel. Each of the network sections 12 and 14 is a pi network and may be considered a simulated transmisison line with lumped constants. The network 12 consists of a plurality of inductors 15 that are connected in series and a plurality of capacitors 16 connected in shunt between the terminals of the inductors 15. The capacitors 16 are voltage variable capacitors, usually referred to as varicaps and may consist of semiconductor junction diodes that change their effective capacitance as a function of the applied bias voltage.

The network section 14 similarly consists of inductors 17 serially connected, and shunt capacitors 18 which are also varicaps. The network 14 may, for example, consist of five inductors 17 and and six capacitors 18. However, the network section 12 comprises six inductors 15 and five variable capacitors 16, with a fixed capacitance 31 serving as a high frequency bypass and an open circuit to the bias voltage supplied by a source 20.

In accordance with the present invention, the network section 12 is designed as a low-pass filter and the network section 14 as its dual filter with continuous cut-offs. As a result the input signal impressed simultaneously through coupling capacitor 11 on both network sections 12 and 14 divides into two input signal portions, each being transmitted through one of the network sections. In the network section 12, the signal portion is 180° out of phase relative to the signal portion in the section 14 by virtue of the inductor 15' that is coupled to the input of the section 12. The purpose of this signal splitting will be explained hereinafter.

The bias voltage is applied to the varicaps 16 and 18 from the source 20 of bias voltage, which is connected to the junction of coupling capacitor 11 and the two network sections 12 and 14 through a choke 21 and an isolating resistor 22 to prevent the input signal from reaching the bias voltage source 20. Thus, it will readily be seen that the bias voltage from source 20 is applied through choke 21 and isolating resistor 22 and through the respective inductors 15', 15 and 17 to each of the variable capacitors 16 and 18. In this manner the effective capacitance of each of the variable capacitors 16 and 18 may be varied simultaneously and in unison at a very rapid rate.

The delayed output signal is obtained from output terminals 23 coupled to the output ends of both of the network sections 12 and 14. The output lead 24 of network section 12 is directly connected to one of the output terminals 23 as shown. It will be noted that the capacitors 16 prevent the bias voltage from source 20 from appearing at the output terminals 23. Similarly, the output lead 25 of the network section 14 is isolated from the bias voltage originating from the source 20 by the capacitors 18. The delayed output signals from the two network sections 12 and 14 that are out of phase are added by an output transformer 27 having a first winding 28 connected between output lead 25 and ground, and a second winding 30 connected between the output lead 24 and ground. The transformer 27 is so wound, as illustrated, that the out of phase signals from the two network sections are combined in phase to provide a delayed output signal from output terminals 23.

The network of the invention has been designed as a constant resistance lattice or ladder network using L. Weinberg's tables and design techniques, published in Hughes Research Laboratories Technical Memorandum No. 427 and entitled "Network Design by Use of Modern Synthesis Techniques and Tables." The above-identified tables and design techniques are also published in an article contained in "The Proceedings of the National Electronics Conference," vol. 12, 1956. The resulting constant resistance lattice has been converted into its unbalanced form. Thus, to improve the pass band of the ladder network, two network sections are utilized. Each of the network sections needs to pass approximately half the frequency range of the input signal. As a result, the possible different phase shifts or time delays that different frequency bands of the input signal may suffer when they pass through the delay network, are greatly minimized. The resulting variable delay network thus is capable of handling input signals with a large frequency band. It will, of course, be understood that the two network sections have such pass bands that substantially all frequencies of the input signal are passed.

Since the varicaps are biased in the reverse direction, loss of bias voltage through the network is practically zero and hence the network requires practically no power. Furthermore, the insertion loss of the network is quite small.

The selection of the components of the network sections 12 and 14 using the above-noted tables and design techniques is accomplished as set forth hereinafter. A quality factor $u$ is first derived from the expression: $u=2\pi fT$, $f$ being the upper frequency of a range of frequencies from $o$ to $f$ that it is desired the network transmit, and T being one-half a nominal value of time delay in a range of desired delays. Table I, hereinafter, is next consulted to obtain a value $n$ corresponding to a value of $u$ in the table equal to or greater than the computed value, and to an acceptable percentage deviation of the time delay from its zero-frequency value.

TABLE I

| $n$ | $u$ for 1% deviation | $u$ for 10% deviation | $u$ for 20% deviation | $u$ for 50% deviation |
|---|---|---|---|---|
| 1 | 0.10 | 0.34 | 0.50 | 1.00 |
| 2 | 0.56 | 1.09 | 1.39 | 2.20 |
| 3 | 1.21 | 1.94 | 2.29 | 3.40 |
| 4 | 1.93 | 2.84 | 3.31 | 4.60 |
| 5 | 2.71 | 3.76 | 4.20 | 5.78 |
| 6 | 3.52 | 4.69 | 5.95 | 6.97 |
| 7 | 4.36 | 5.64 | 6.30 | 8.15 |
| 8 | 5.22 | 6.59 | 7.30 | 9.33 |
| 9 | 6.08 | 7.55 | 8.31 | 10.50 |
| 10 | 6.96 | 8.52 | 9.33 | 11.67 |
| 11 | 7.85 | 9.49 | 10.34 | 12.84 |

For example, assuming a $u$ of 8.87, and an allowable percentage deviation of 10%, one obtains an $n$ of 11, upon consulting Table I.

For the particular lattice configuration of network section 12, normalized values for inductors 15 and capacitors 16 are obtained by consulting Table II hereinafter:

TABLE II

| Value of $n$ | $L_1$ | $C_2$ | $L_3$ | $C_4$ | $L_5$ | $C_6$ | $L_7$ | $C_8$ | $L_9$ | $C_{10}$ | $L_{11}$ |
|---|---|---|---|---|---|---|---|---|---|---|---|
| 1 | 1.0000 | | | | | | | | | | |
| 2 | | 0.3333 | 1.0000 | | | | | | | | |
| 3 | 0.1667 | 0.4800 | 0.8333 | | | | | | | | |
| 4 | | 0.1000 | 0.2899 | 0.4627 | 0.7101 | | | | | | |
| 5 | 0.0667 | 0.1948 | 0.3103 | 0.4215 | 0.6231 | | | | | | |
| 6 | | 0.0476 | 0.1400 | 0.2246 | 0.3005 | 0.3821 | 0.5595 | | | | |
| 7 | 0.0357 | 0.1055 | 0.1704 | 0.2288 | 0.2827 | 0.3487 | 0.5111 | | | | |
| 8 | | 0.0278 | 0.0823 | 0.1338 | 0.1806 | 0.2227 | 0.2639 | 0.3212 | 0.4732 | | |
| 9 | 0.0222 | 0.0660 | 0.1077 | 0.1463 | 0.1811 | 0.2129 | 0.2465 | 0.2986 | 0.4424 | | |
| 10 | | 0.0382 | 0.0541 | 0.0886 | 0.1209 | 0.1549 | 0.1880 | 0.2057 | 0.2209 | 0.2712 | 0.4161 |
| 11 | 0.0152 | 0.0451 | 0.0741 | 0.1016 | 0.1269 | 0.1499 | 0.1708 | 0.1916 | 0.2175 | 0.2639 | 0.3955 |

In the table, $L_1$, $L_3$, $L_5$, $L_7$, $L_9$ and $L_{11}$ are the successive series inductors 15 (from left to right) that are required in the network for a given value of $n$, while $C_2$, $C_4$, $C_6$, $C_8$ and $C_{10}$ are the successive parallel capacitors 16. Thus, for $n=11$, six series inductors are required with normalized values from left to right respectively of 0.0152, 0.0741, 0.1269, 0.1708, 0.2175, and 0.3955. In addition, five parallel capacitors are required with normalized values from left to right respectively of 0.0451, 0.1016, 0.1499, 0.1916, and 0.2639.

As previously noted, network section 14 is derived as the dual filter of section 12. To obtain the dual, an inductance of L henrys becomes a capacitance of L farads and conversely a capacitance of C farads becomes an inductance of C henrys. The normalized capacitance values of capacitors 18 are then the inductance values in Table II, and the normalized inductance values of inductors 17 are the capacitance values. Hence for $n=11$, the capacitors 18 from left to right have values of 0.0152, 0.0741, 0.1269, 0.1708, 0.2175, and 0.3955. The inductors 17 from left to right have values of 0.0451, 0.1016, 0.1499, 0.1916, and 0.2639.

Finally, the physical values of the inductors and capacitors are derived by removing the normalizations of the values obtained from Table II. This is accomplished by multiplying every normalized inductance by RT and every normalized capacitance by $T/R$, where R is the terminating impedance of the network.

It has been found that a time delay of 0.4 microsecond may be obtained with the delay network of the invention. This time delay may be varied at a rate exceeding 100,000 times per second. The input signal may have a frequency range of 8 megacycles per second without causing serious phase shifts of various frequency components of the input signal with respect to each other.

There has thus been disclosed a variable time delay network that permits varying the time delay electronically at a very high rate. The network has small insertion loss, requires a minimum of power, and is small in size and in the number of components required. The network consists of two network sections so that each section passes approximately only a portion of the frequency range of the input signal. This permits possible phase shifts or different time delays of different frequency ranges of the input signal to the minimized. In turn, this makes it possible to delay variably an input signal having a wide frequency range.

What is claimed is:

1. A variable delay network for variably delaying a signal having a wide frequency band comprising:
   - input terminals;
   - output terminals;
   - a first transmission line network section and a second transmission line network section connected in parallel between said input and output terminals, each of said network sections including a plurality of inductors and a plurality of voltage variable capacitors, and each of said network sections being arranged to provide a different phase shift to the different portions of the frequency band; and means connected to both of said network sections for applying a variable bias voltage to said capacitors to vary simultaneously the capacitance thereof, whereby the delay presented to said signal by both said network sections is varied.

2. A variable delay network for variably delaying a signal having a wide frequency band comprising:

input terminals;

output terminals;

a first pi network section and a second pi network section connected in parallel between said input and output terminals, each of said network sections being arranged to delay different portions of the frequency band by a different amount including a plurality of inductors and a plurality of voltage variable capacitors;

means connected to both of said network sections for applying a variable bias voltage to said capacitors through said inductors to vary in unison the capacitance thereof, whereby the delay presented to said signal is varied; and transformer means coupled between said network sections and said output terminals for adding the signals transmitted through said network sections.

3. A variable delay network for variably delaying an input signal having a wide frequency band comprising:

a first network section and a second network section;

means for applying said input signal in parallel to both of said sections, each of said network sections including a plurality of inductors and a plurality of voltage variable capacitors; and means connected to both of said network sections for applying a variable bias voltage to said capacitors to vary in unison the capacitance thereof, said first network section being arranged as a low pass filter, said second network section being arranged as a dual filter, whereby the phase shifts of the two input signal portions passing through the individual network sections are about 180° out of phase.

4. A variable delay network for variably delaying an input signal having a wide frequency band comprising:

a first network section and a second network section;

means for applying said input signal in parallel to both of said sections, each of said network sections including a plurality of inductors and a plurality of voltage variable capacitors;

means connected to both of said network sections for applying a variable bias voltage to said capacitors to vary in unison the capacitance thereof, said first network section being arranged as a low pass filter, said second network section being arranged as a dual filter, whereby the phase shift of each input signal portion passing through one of said network sections is approximately equal and opposite to that of the other input signal portion; and means at the output end of said network sections for adding the delayed input signal portions.

5. A variable delay network for variably delaying an input signal having a wide frequency band comprising:

a first transmission line network section and a second transmission line network section;

means for applying said input signal in parallel to both of said sections, each of said network sections including a plurality of inductors and a plurality of voltage variable capacitors;

means connected to both of said network sections for applying a variable bias voltage to said capacitors to vary simultaneously and in unison the capacitance thereof, said first network section being arranged as a low pass filter, said second network section being arranged as its dual filter, whereby the phase shifts of the two input signal portions passing through the individual network sections are approximately equal and opposite; and a transformer coupled to the output end of said network sections for adding the out of phase delayed input signal portions.

References Cited by the Examiner

UNITED STATES PATENTS

| | | | |
|---|---|---|---|
| 1,647,242 | 11/1927 | Mills | 333—29 |
| 2,085,418 | 6/1937 | Crosby | 333—29 |
| 2,191,315 | 2/1940 | Guanella | 333—29 |
| 2,263,376 | 11/1941 | Blumlein | 333—29 |
| 2,403,151 | 7/1946 | Smith | 333—72 |
| 2,907,957 | 10/1959 | Dewitz | 333—29 |
| 3,189,820 | 6/1965 | Lowman | 324—82 |
| 3,202,769 | 8/1965 | Coleman | 333—29 |

HERMAN KARL SAALBACH, *Primary Examiner.*

C. BARAFF, *Assistant Examiner.*